US010779523B2

(12) United States Patent
DeFreitas

(10) Patent No.: US 10,779,523 B2
(45) Date of Patent: Sep. 22, 2020

(54) ONE HAND FISHING REEL SYSTEMS AND METHODS FOR MANUFACTURING THEREOF

(71) Applicant: Reel American Heroes Foundation, Woodbridge, VA (US)

(72) Inventor: Ronald R. DeFreitas, Woodbridge, VA (US)

(73) Assignee: Reel American Heroes Foundation, Woodbridge, VA (US)

( * ) Notice: Subject to any disclaimer, the term of this patent is extended or adjusted under 35 U.S.C. 154(b) by 57 days.

(21) Appl. No.: 15/923,421

(22) Filed: Mar. 16, 2018

(65) Prior Publication Data

US 2018/0279593 A1 Oct. 4, 2018

Related U.S. Application Data

(60) Provisional application No. 62/472,213, filed on Mar. 16, 2017.

(51) Int. Cl.
*A01K 89/01* (2006.01)
*A01K 89/012* (2006.01)
*B65H 55/04* (2006.01)
*A01K 89/00* (2006.01)

(52) U.S. Cl.
CPC .......... *A01K 89/012* (2013.01); *A01K 89/006* (2013.01); *A01K 89/0105* (2013.01); *A01K 89/0111* (2013.01); *B65H 55/04* (2013.01); *B65H 2402/30* (2013.01); *B65H 2403/92* (2013.01); *B65H 2701/355* (2013.01)

(58) Field of Classification Search
CPC .............. A01K 89/0105; A01K 89/012; A01K 89/006; A01K 89/01082; A01K 89/01084; A01K 89/01123
See application file for complete search history.

(56) References Cited

U.S. PATENT DOCUMENTS

| | | | | |
|---|---|---|---|---|
| 5,088,657 A * | 2/1992 | Chen | ..................... | A01K 89/006 242/225 |
| 6,056,219 A * | 5/2000 | Barkley | ............... | A01K 89/012 242/225 |
| 6,056,220 A * | 5/2000 | Cockerham | ...... | A01K 89/01084 242/233 |
| 6,056,221 A * | 5/2000 | Stiner | .............. | A01K 89/01084 242/233 |
| 6,126,104 A * | 10/2000 | Kellerman | ........... | A01K 89/012 242/225 |
| 6,880,775 B1 * | 4/2005 | Wenzel | ............ | A01K 89/01121 242/225 |
| 7,269,922 B1 * | 9/2007 | Mack | .................... | A01K 87/007 43/21 |
| 8,833,689 B1 * | 9/2014 | Brown | ................. | A01K 87/007 242/225 |

(Continued)

*Primary Examiner* — Emmanuel M Marcelo
(74) *Attorney, Agent, or Firm* — Goodwin Procter LLP

(57) ABSTRACT

A one hand spinning reel system includes a fixed spool and a bail coupled to a trigger switch for opening and optionally closing the bail, and a solid spindle coupled to a motor that is controlled by a motor switch. When the one hand spinning reel system is affixed to a fishing rod, the trigger switch and the motor switch can be operated, and the fishing line can be controlled, using the same hand used to hold the fishing rod and to cast the fishing line.

20 Claims, 3 Drawing Sheets

(56) References Cited

U.S. PATENT DOCUMENTS

| | | | | |
|---|---|---|---|---|
| 2006/0076444 A1* | 4/2006 | Westhoff | .............. | A01K 87/007 |
| | | | | 242/225 |
| 2012/0280074 A1* | 11/2012 | Badur | .................. | A01K 89/006 |
| | | | | 242/250 |
| 2013/0276348 A1* | 10/2013 | Lauzon | ................ | A01K 87/007 |
| | | | | 43/21 |
| 2016/0088822 A1* | 3/2016 | Masten | ................ | A01K 89/017 |
| | | | | 242/419.9 |

* cited by examiner

ONE HAND FISHING REEL SYSTEMS AND METHODS FOR MANUFACTURING THEREOF

CROSS-REFERENCE TO RELATED APPLICATION(S)

This patent application claims priority to and benefit of U.S. Provisional Patent Application No. 62/472,213, entitled "A One Hand Fishing Reel System and Methods for Manufacturing Thereof," and filed on Mar. 16, 2017, the entire contents of which are incorporated herein by reference.

FIELD OF THE INVENTION

This disclosure generally relates to fishing reel systems and methods for manufacturing such reel systems and, in particular, to fishing reels that can be usually operated with only one hand.

BACKGROUND OF THE INVENTION

Reels commonly used for fishing are generally classified as fly-fishing reels, revolving-spool reels, and fixed-spool reels. Revolving-spool reels are also called baitcasting reels, and fixed-spool reels are often generally referred to as spinning reels. Fixed-spool reels include spincast reels and spinning reels. Spincast reels (also called closed face reels) are generally considered to be the easiest to use. A spincast reel includes a button, which is pressed while moving the fishing rod backward, to prevent the fishing line to be released during the backward motion. During the forward cast, the button is released so that the fishing line can fly off the fixed spool. The button can be pressed again to stop the lure attached to the end of the fishing line at a desired location. A spincast reel also has a handle that when cranked causes a pickup pin to engage with the fishing line, so as to spool the line onto the fixed spool.

A spinning reel (also called an open face reel) includes a wire bail and a line roller to spool the line. Spinning reels typically do not include a button to stop the release of the fishing line. Instead, an angler can hold the line using a finger during the backward motion and release the finger during forward cast. Pressure can be applied to the line using a finger during the forward cast to slow down or stop the release of the line, so as to control the casting distance. To retrieve the line, the angler must close the bail and crank a handle, which would spin the bail to spool the line onto the fixed spool.

Spincast reels generally tend to be less accurate than spinning (open face) reels with respect to controlling the direction and/or distance of the cast. The cast distance of spincast reels is typically less than that of spinning reels and the spincast reels usually do not support heavier lines and lures that spinning reels can support. Moreover, due to their closed face design, spincast reels tend to be less durable than spinning reels. Spinning reels generally allow for good direction and distance control, and support heavier fishing lines and lures than those that can be typically used with spincast reels. Spinning reels are also considered to be easier to use than baitcasting reels. Due to their open face design, spinning reels can be cleaned relatively easily and, as such, tend to be more durable than spincast reels. Therefore, spinning reels are a popular choice over spincast and baitcasting reels. Like the spincast and baitcasting reels, however, a spinning reel also requires an angler to crank the handle with on hand while holding the fishing rod with another hand. As such, it is difficult if not impossible for a person who has or can use only one arm or hand, such as a wounded soldier or any other handicapped person, to operate a conventional spinning reel.

SUMMARY OF THE INVENTION

Various embodiments described herein of a one arm fishing reel system may allow anyone who has lost a hand or an arm or has limited use of one hand or arm to enjoy fishing, e.g., as form of recreational therapy. Such a person can be a wounded or disabled soldier, sailor, airmen, marine, or any other disabled person. Various embodiments of the one arm fishing reel system can provide this benefit while adding only a few ounces of weight to the fishing rod and reel combination. This is achieved, at least in part, by removing and replacing the spindle and the crank handle of a spinning (open face) reel with a solid spindle that is durable, and by attaching a motor and a motor switch to the spindle. In addition, a trigger switch is provided to open and close the bail of the spinning reel. Different operations, including holding the fishing rod, opening the bail during casting, controlling the release of the fishing line, and retrieving the line using a switch that operates and controls the motor, can be performed with only one hand.

Accordingly, in one aspect a fishing reel system is provided. The system includes a spinning reel having a bail and a spool, and lacking a reel handle and a first (e.g. an originally supplied) spindle coupled to the reel handle. The system includes a second different spindle coupled to a crank mechanism of the reel and to a motor. The system also includes a variable speed switch in electrical communication with the motor, and a trigger switch coupled to the bail. The system further includes a mounting bracket affixed to the spinning reel, wherein the motor is affixed to the mounting bracket. The motor and/or the trigger switch may also be affixed to the mounting bracket.

In various embodiments, the second spindle is substantially solid. The motor may be welded to the second spindle. In various embodiments, the weight of the spinning reel system does not exceed six ounces plus weight of a conventional spinning reel having the reel handle and the first spindle and lacking each of: the second spindle, the motor, the variable speed switch, and the mounting bracket.

In various embodiments, the fishing reel system additionally includes a battery pack in electrical communication with the motor. The motor can be a 12V DC motor, and the battery pack can be a battery pack rated to supply a 12V DC output for 1 hour, 2 hours, 4 hours, 6 hours, or for a different or a longer time. In some embodiments, the fishing reel system includes a power adapter in electrical communication with the motor. The variable speed switch is electrically coupled to the motor via a pair of flexible, insulated wires or wirelessly. The variable speed switch may be mounted on the motor and/or on the mounting bracket. The mounting bracket may be affixed to a side plate of the spinning reel using screws.

In another aspect, a method is provided for assembling a fishing reel system. The method includes removing a reel handle and a first spindle coupled to the reel handle, from a spinning reel that includes a bail and a spool. The method also includes coupling a second spindle to a cranking mechanism of the spinning reel, and coupling a motor to the second spindle. The method additionally includes electrically coupling a variable speed switch to the motor, affixing a mounting bracket to the spinning reel, and affixing the motor to the mounting bracket. These operations may be performed in any suitable order.

In some embodiments, coupling the motor to the second spindle includes welding the motor to the second spindle. The method may additionally include affixing a battery pack to the mounting bracket, and electrically coupling the battery pack to the motor. The motor can be a 12V DC motor, and the battery pack may be rated to supply a 12V DC output for at least one or several hours. In some embodiments, the method includes providing a power adapter in electrical communication with the motor.

Electrically coupling the variable speed switch to the motor may include one of: wirelessly coupling the variable speed switch to the motor, and coupling the variable speed switch to the motor via a pair of flexible, insulated wires. The method may also include mounting the variable speed switch on the mounting bracket. Affixing the mounting bracket to the spinning reel may include screwing the mounting bracket to a side plate of the spinning reel. In some embodiments, the method includes affixing a trigger switch to the mounting bracket, and coupling a trigger switch to the bail. The method may also include affixing the fishing reel system to a fishing rod.

BRIEF DESCRIPTION OF THE DRAWINGS

In the drawings, like reference characters generally refer to the same parts throughout the different views. Also, the drawings are not necessarily to scale; instead emphasis is generally placed upon illustrating the principles of the invention. Various embodiments of the present invention taught herein are illustrated by way of example, and not by way of limitation, in the figures of the accompanying drawings, in which.

DETAILED DESCRIPTION OF THE INVENTION

Figure 1:
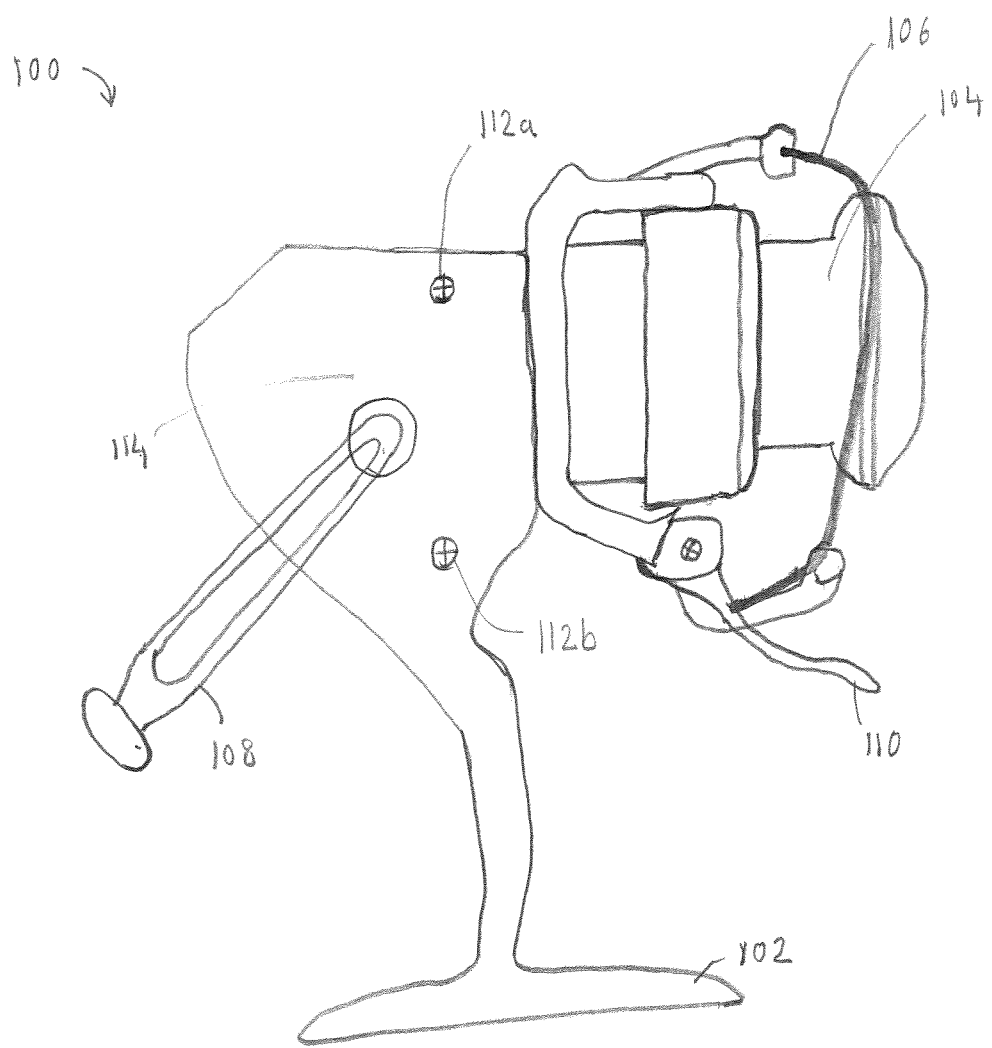
FIG. 1 depicts an unmodified spinning reel, and various components thereof.

FIG. 1 depicts a spinning reel 100 that includes a base 102, a fixed spool 104, a bail/bail arm 106, and a handle 108. The reel 100 also includes a trigger switch 110, but not all spinning reels always include a trigger switch. In some cases, we use a spinning reel having a trigger switch manufactured into the reel. In the reel 100, the trigger switch 110 can open and close the bail 106. In other cases, the reel does not include a trigger switch, so we install in the reel assembly a trigger switch configured to open and close the bail. This allows a person to open the bail arm of the reel with one finger while casting the line, and to close the bail arm for retrieval of the fishing line. In some embodiments, the bail arm closes automatically when the spindle rotates. In these embodiments, the trigger switch may only open the bail arm during forward casting.

Figure 2:
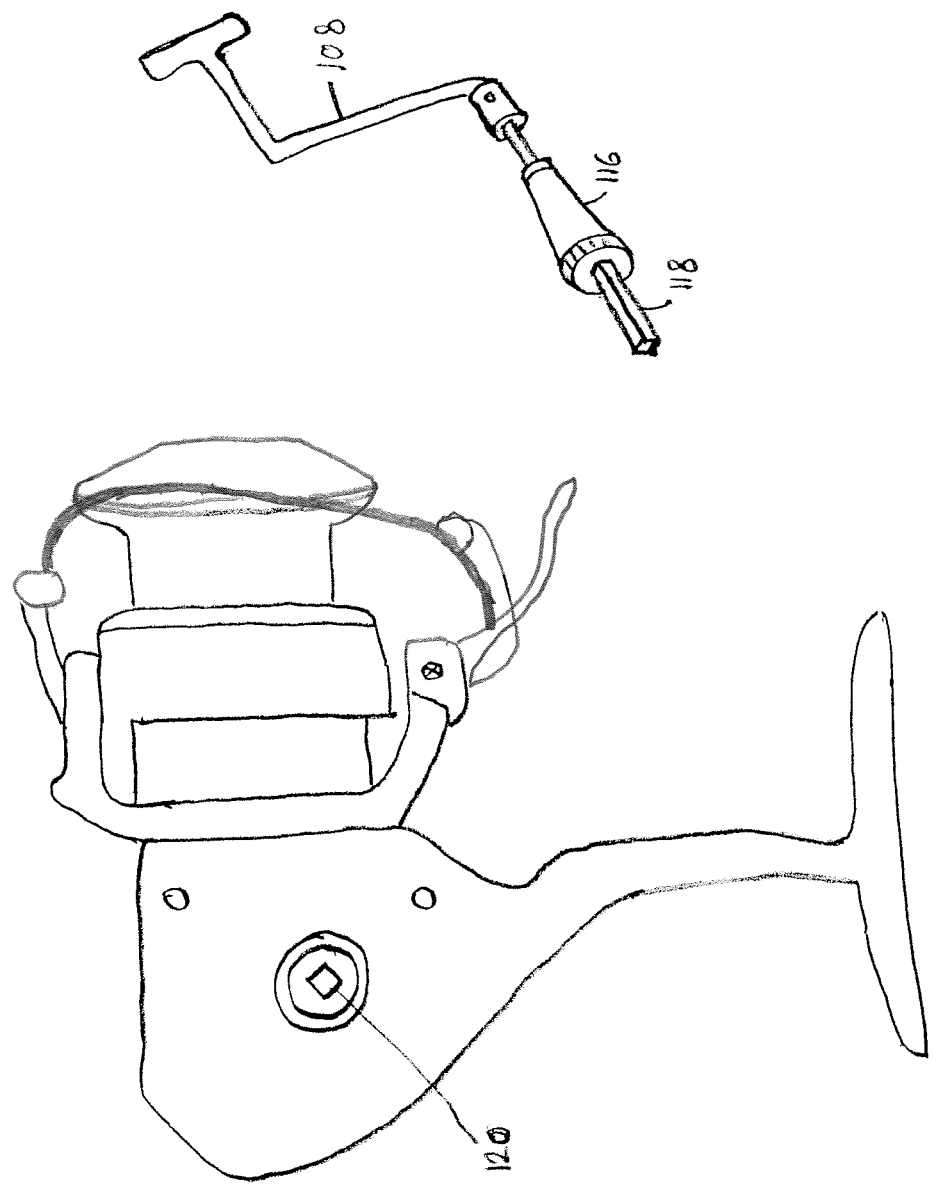
FIG. 2 depicts a spinning reel with certain parts thereof removed, according to some embodiments.

In various embodiments, we remove the thumb screw(s) 112a-b from a reel 100 which allows us to remove the side cover/plate 114 of the reel and the spindle and handle 106 that are used in reeling in the fishing line. FIG. 2. depicts the spinning reel 100 of FIG. 1, with the cover plate 114 removed. FIG. 2 also shows the reel handle 108, the collar 116, and the spindle 118, that are also removed. In addition, FIG. 2 shows the exposed cranking mechanism 120 of the spinning reel 100.

Spindles (such as the spindle 118) that are typically used in spinning reels have drilled holes that make these spindles susceptible to failure, especially when operated using a motor. We therefore use a solid spindle that is stronger, and attach a small motor, e.g., a 12V motor, to the solid spindle. The solid spindle can be attached to the motor by welding, using bolts, using specialized structural adhesives, etc.

Figure 3:
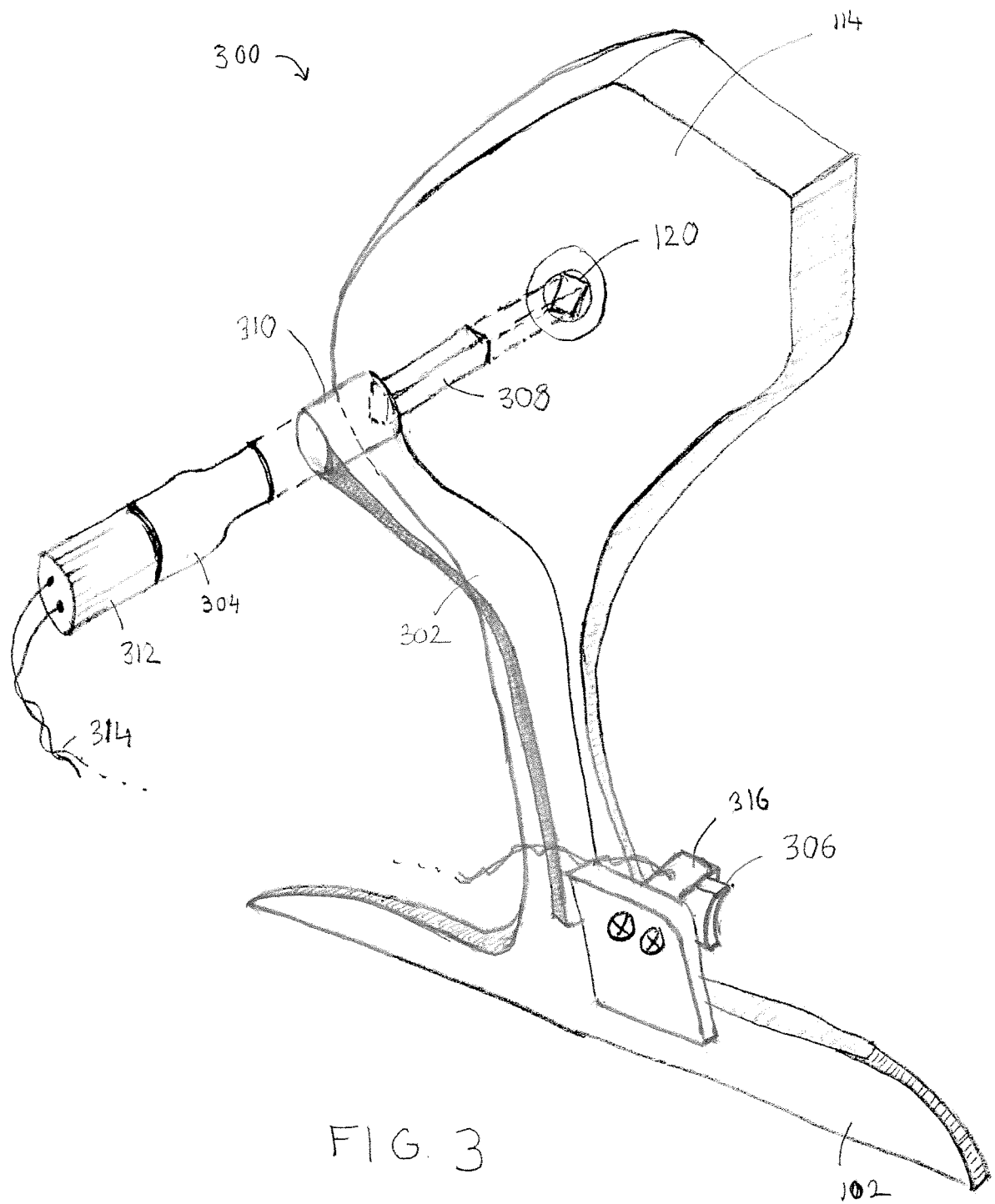
FIG. 3 depicts some components of a spinning reel system, according to some embodiments.

With reference to FIG. 3, in various embodiments of a reel system 300, we install a mounting bracket 302 on a side plate 114 of the reel 100. In FIG. 3, some portions of the reel 100 are not shown for the sake of clarity. The mounting bracket supports the motor 304 and a motor switch 306 used to control the motor and, hence, the mounting bracket 302 should be strong and durable. But the mounting bracket should also be light weight, so as not to burden the angler. Such a mounting bracket can be made from aluminum, tungsten, certain kind of plastics (e.g., ultra-violet (UV) light stabilized high density polyethylene (HDPE), UV light stabilized ultra-high molecular weight polyethylene (UHMW-PE)), wood, etc. The mounting bracket 302 can be affixed to the side plate 114 using machine screws, rivets, bolts, etc.

Next, a solid spindle 308, with motor 304 attached thereto, is inserted into the cranking mechanism 120 of the reel 100. The motor is affixed to mounting bracket 302 via a coupling portion 310, that is attached to or is part of the motor assembly, using screws, rivets, bolts, etc. FIG. 3 shows a partially exploded view of this assembly for the sake of illustration. When assembled, the solid spindle 308 is fully inserted into the crank mechanism 120. The mounting bracket 302 rests on the side plate 114 of the reel 100. The coupling portion 310 is in contact with and is affixed to the mounting bracket 302. In some embodiments, the motor 304 is affixed to the coupling portion 310, and in other embodiments, the coupling portion 310 is an integral part of the motor 304.

In various embodiments, the motor 304 is electrically coupled using cables or wirelessly to the motor switch 306 that is affixed to the mounting bracket 302. In some embodiments, the motor switch is affixed to or is an in-built component of the motor 304. The motor switch 306 can turn the motor 304 ON and OFF. In some embodiments, the motor switch 306 is a variable speed thumb switch, that can control the motor speed, either gradually, or in preset steps. In some embodiments, a small, light-weight battery pack 312 (e.g., a 24 V, 12 V, 9V battery pack) is both mechanically and electrically coupled to the motor 304. The battery pack may be rated to supply a preset output voltage (e.g., a 24 V, 12 V, 9V, etc.) for a duration of one hour, two, four, six hours, etc., or for a longer duration.

In the system 300, a cable 314 connects the motor 304 and the battery pack 312 to the motor the motor switch 306. A flexible cable harness may be provided at the battery pack end and/or at the motor switch end to protect the cable 314 and its respective contacts with the battery pack 312 and/or the motor 304, and/or with the motor switch 306 from water and other debris. Likewise, an optional switch cover 316 may be provided and affixed to the mounting bracket 302 to protect the motor switch 306 from water and/or debris. The switch cover 316 may permit only a limited movement of the motor switch 306, such as in-and-out movement, or up-and-down movement, but no sideways movement. This can improve the durability of the reel system 300.

In some embodiments, the battery pack 312 is mounted on the mounting bracket 302, and is electrically coupled to the motor 304. In some other embodiments the motor 304 is electrically coupled using cables to a power adapter, e.g., 24 V, 12 V, or 9V adapter, e.g., for use in boats. A flexible cable harness may be used to protect the contacts between the power-adapter cable and the motor and/or the cable and the power adapter. The power adapter may be mechanically affixed to the motor 304 or to the mounting bracket 302. A cable from the power adapter can be plugged into a standard power outlet. In some embodiments, the motor 304 includes an in-built power adapter, where a cable from the motor can be plugged directly into a standard power outlet. The examples of 9V, 12V, and 24V motor, battery pack, and power adapter are illustrative only. Motors operating at other, different voltages, and corresponding battery packs, AC or DC power sources, and power adapters are also contemplated.

During assembly, typically the side plate 114 is removed from the reel 100 and the mounting bracket 302 is mounted on the side plate 114, as described above. The motor 304, the motor switch 306, the battery pack, and/or the power adapter are then affixed to the mounting bracket 302. If the reel 100 does not include a trigger switch (such as the trigger switch 110 shown in FIG. 1), a trigger switch is also affixed to the mounting bracket 302. Thereafter, the side plate 114 is reinstalled onto the reel 100 using the thumb screw(s) 112a, 112b, or other suitable mechanisms. Thus, the motor 304, the motor switch 306, and the trigger switch are now affixed to the reel 100. The motor 304 and the solid spindle 308 are coupled to the crank mechanism 120, and the trigger switch is coupled to the bail 106 (shown in FIG. 1). The side plate 114 may be reinstalled first, and then the mounting bracket, with our without additional components such as the motor assembly and the motor switch, may be affixed to the side plate 114. Once assembled, the reel system may be affixed to a fishing rod, e.g., using the base 102 (shown in FIGS. 1 and 3). When the one hand spinning reel system is affixed to a fishing rod, the trigger switch and the motor switch can be operated, and the fishing line can be controlled, using the same hand used to hold the fishing rod and to cast the fishing line.

In various embodiments, after the side plate 114 is removed from the reel 100, the original spindle 118, collar 116, and crank handle 108 (all three are shown in FIG. 2) are removed and discarded. After adding the other parts, such as the mounting bracket 302, motor 304, the solid spindle 308, the motor switch 306, and a trigger switch (if needed), the weight of the reel system 300 increases by approximately four ounces (e.g., by 3.5; 3.8; 3.95; 4.2; 4.5; 5.0; 6.0 ounces, etc.). This allows our wounded heroes and disabled persons to fish all day long without significant pain and/or discomfort the heavier systems can cause over time.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods and systems provided herein are not to be limited to the embodiments disclosed herein, can include practices otherwise than specifically described, and are to be interpreted as broadly as allowed under the law.

Accordingly, I claim:

1. A fishing reel system comprising:
a spinning reel comprising a bail and a spool, and lacking a reel handle and a first spindle coupled to the reel handle;
a second spindle coupled to a crank mechanism of the reel and to a motor;
a motor switch in electrical communication with the motor;
a trigger switch coupled to the bail; and
a mounting bracket affixed to the spinning reel, the motor and the motor switch being affixed to the mounting bracket.

2. The fishing reel system of claim 1, wherein the second spindle is substantially solid.

3. The fishing reel system of claim 1, wherein the motor is welded to the second spindle.

4. The fishing reel system of claim 1, wherein weight of the spinning reel system does not exceed six ounces plus weight of a conventional spinning reel having the reel handle and the first spindle and lacking the second spindle, the motor, the variable speed switch, and the mounting bracket.

5. The fishing reel system of claim 1, further comprising a battery pack in electrical communication with the motor.

6. The fishing reel system of claim 5, wherein:
the motor comprises a 12V DC motor; and
the battery pack comprises a battery pack rated to supply a 12V DC output.

7. The fishing reel system of claim 1, wherein the motor switch is a variable speed motor switch.

8. The fishing reel system of claim 1, wherein the variable speed switch is electrically coupled to the motor via a pair of flexible, insulated wires or wirelessly.

9. The fishing reel system of claim 1, wherein the variable speed switch is mounted on at least one of the motor and the mounting bracket.

10. The fishing reel system of claim 1, wherein the mounting bracket is affixed to a side plate of the spinning reel using screws.

11. A method of assembling a fishing reel system, the method comprising:
removing a reel handle and a first spindle coupled to the reel handle, from a spinning reel comprising a bail and a spool;
coupling a second spindle to a cranking mechanism of the spinning reel, and coupling a motor to the second spindle;
electrically coupling a motor switch to the motor;
affixing a mounting bracket to the spinning reel; and
affixing the motor and the motor switch to the mounting bracket.

12. The method of claim 11, wherein coupling the motor to the second spindle comprises welding the motor to the second spindle.

13. The method of claim 11, further comprising:
affixing a battery pack to the mounting bracket; and
electrically coupling the battery pack to the motor.

14. The method of claim 13, wherein:
the motor comprises a 12V DC motor; and
the battery pack comprises a battery pack rated to supply a 12V DC output.

15. The method of claim 11, wherein the motor switch is a variable speed motor switch.

16. The method of claim 11, wherein electrically coupling the variable speed switch to the motor comprises one of:
wirelessly coupling the variable speed switch to the motor; and coupling the variable speed switch to the motor via a pair of flexible, insulated wires.

17. The method of claim 11, further comprising mounting the variable speed switch on the mounting bracket.

18. The method of claim 11, wherein affixing the mounting bracket to the spinning reel comprises screwing the mounting bracket to a side plate of the spinning reel.

19. The method of claim 11, further comprising:
affixing a trigger switch to the mounting bracket; and
coupling a trigger switch to the bail.

20. The method of claim 11, further comprising affixing the fishing reel system to a fishing rod.

* * * * *